(12) United States Patent
Tan et al.

(10) Patent No.: US 12,174,296 B2
(45) Date of Patent: Dec. 24, 2024

(54) AUTOMATED LIDAR TARGET SIMULATION SCANNING SYSTEMS AND METHODS

(71) Applicant: Keysight Technologies, Inc., Santa Rosa, CA (US)

(72) Inventors: Chan Fong Tan, Penang (MY); Kok Eng Looi, Penang (MY); Yenn Chang Tan, Penang (MY); Chee Wei Liu, Penang (MY)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 984 days.

(21) Appl. No.: 17/176,807

(22) Filed: Feb. 16, 2021

(65) Prior Publication Data

US 2022/0260714 A1  Aug. 18, 2022

(51) Int. Cl.
  *G01S 17/06* (2006.01)
  *G01S 7/481* (2006.01)
  *G01S 7/484* (2006.01)
  *G01S 7/486* (2020.01)
  *G01S 17/93* (2020.01)

(52) U.S. Cl.
  CPC ............ *G01S 17/06* (2013.01); *G01S 7/4817* (2013.01); *G01S 7/484* (2013.01); *G01S 7/486* (2013.01); *G01S 17/93* (2013.01)

(58) Field of Classification Search
  None
  See application file for complete search history.

(56) References Cited

U.S. PATENT DOCUMENTS

| | | | |
|---|---|---|---|
| 10,306,494 B2 | 5/2019 | Foegelle | |
| 10,470,009 B2 | 11/2019 | Rowell et al. | |
| 2019/0253701 A1* | 8/2019 | Himel | G01S 17/89 |

FOREIGN PATENT DOCUMENTS

| | | |
|---|---|---|
| CN | 204188807 U | 3/2015 |
| CN | 110703265 A | 1/2020 |

* cited by examiner

*Primary Examiner* — Luke D Ratcliffe (57) ABSTRACT

An apparatus automatically positions an optical test module relative to a Lidar sensor during a target simulation test of the Lidar sensor. The apparatus includes a sensor platform configured to support a Lidar sensor, and a test module platform configured to support an optical test module such that an optical window of the optical test module faces in a direction towards the Lidar sensor supported by the sensor platform. The apparatus further includes a vertical actuator configured to convey the test module platform relative to the sensor platform such that the optical test module moves in a vertical arc while the optical window of the optical test module faces the Lidar sensor, a horizontal actuator configured to convey the test module platform relative to the sensor platform such that the optical test module moves in a horizontal arc while the optical window of the optical test module faces the Lidar sensor, and a rotational actuator configured to rotate the optical test module about a vertical axis of the test module platform.

20 Claims, 9 Drawing Sheets

AUTOMATED LIDAR TARGET SIMULATION SCANNING SYSTEMS AND METHODS

BACKGROUND

Modern cars increasingly incorporate so-called Advanced Driver Assistance Systems (ADAS). Among these, already well established are Emergency Brake Assist (EBA) and Lane Assist (LA) systems, with the goal being fully autonomous vehicles. All these systems require sensors to allow an electronic (or engine) control unit (ECU) of the vehicle to gather sufficient information indicative of the surrounding environment. Examples of commonly used and/or proposed ADAS sensors include ultrasonic sensors, video cameras, radar sensors and Lidar (or LiDAR) sensors.

Lidar, in particular, has the potential to become the main sensor for automotive autonomous driving systems due to its ability to provide accurate and long-range three-dimensional (3D) information for localization and mapping applications as well as for object detection collision avoidance. Lidar is a scanning process that rapidly measures the distance to objects at a number of different directions from the sensor. To cover the entire field of view, repetitive measurements are performed, and the results from different angles and time instances are stored as a point cloud. Generally, Lidar systems operate by generating light pulses from a light (laser) source fixed within a sensor. The light pulses may, for example, illuminate a spinning mirror that redirects the light in different azimuth angles from the sensor. Lidar may include multiple transmitters and receivers adapted to transmit and receive laser light to/from the surroundings to exact certain measurements, such as the distance of different objects from the Lidar.

One major challenge when developing ADAS equipped vehicles is to verify proper operations in the myriad of different scenarios which might occur in real traffic. To carry out this verification in real life is not a suitable possibility, as it is hard to achieve the required coverage (i.e. to actually test all relevant scenarios) and this would require too much time (thousands of hours). Additionally, all sensors must be verified in concert as it is important to verify that the ECU makes the right decision based on the data it is gathering from all sensors.

Lidar test solutions generally include an optical front-end module and base unit. The optical front-end module is operative to capture a laser beam emitted from a Lidar sensor under test, and to return a simulated reflection light signal back to the Lidar after delay processing by the base unit. A delay line module in the base unit operates to introduce delay into the simulated reflection signal according to, for example, the location (distance) of virtual objects (called targets) in a simulated drive scenario. It is difficult, however, to capture an entirety of the laser beam emission from the Lidar using a single optical front-end module. This is in part because the firing angle of the Lidar (e.g., about 20 to 30 degrees) may exceed the collection angle of the optical front-end module (e.g., about 5 degrees). While it may be possible to alter the optical lens system of the optical module to increase the collection angle, the result is degradation in focus characteristics which can result in performance errors. As such, in order to capture and accurately process all laser beam emissions, it may be necessary to provide multiple (e.g., 5 or more) optical modules. In addition to increasing costs, the provision of multiple optical modules significantly increases the complexity of the interface and synchronization with the base unit.

SUMMARY

According to an aspect of the inventive concepts, an apparatus is provided for automated positioning of an optical test module relative to a Lidar sensor during a target simulation test of the Lidar sensor. The apparatus includes a sensor platform configured to support a Lidar sensor, and a test module platform configured to support an optical test module such that an optical window of the optical test module faces in a direction towards the Lidar sensor supported by the sensor platform. The apparatus further includes a vertical actuator configured to convey the test module platform relative to the sensor platform such that the optical test module moves in a vertical arc while the optical window of the optical test module faces the Lidar sensor, a horizontal actuator configured to convey the test module platform relative to the sensor platform such that the optical test module moves in a horizontal arc while the optical window of the optical test module faces the Lidar sensor, and a rotational actuator configured to rotate the optical test module about a vertical axis of the test module platform.

The vertical actuator may include a pivotally mounted arm having a distal end fixed to the test module platform, and a motor for rotating the pivotally mounted arm about a pivot point of the pivotally mounted arm. In this case, the pivot point of the pivotally mounted arm may be aligned in a horizontal direction with a focal point of the Lidar sensor supported by the sensor platform. The horizontal actuator may include an x-axis motor configured to move the test module platform such that the optical test module moves along a horizontal x-axis, and a y-axis motor configured to move the test module platform such that the optical test module moves along a horizontal y-axis perpendicular to the x-axis.

The test module platform is configured to detachably support any of plural different types of optical test modules. The plural different types of optical test modules may include a first type of optical test module including a single optical window and a single sub-module, and a second type of optical test module including two or more optical windows and two or more sub-modules.

A horizontal and a vertical position of the sensor platform may be fixed. Also, a second rotational actuator may be configured to rotate the Lidar sensor about a vertical axis of the sensor platform.

A center point defined by the vertical arc may correspond to a focal point of the Lidar sensor supported by the sensor platform. Likewise, a center point defined by the horizontal arc may correspond to the focal point of the Lidar sensor supported by the sensor platform.

The rotational actuator may be configured to rotate the optical test module such that the optical window of the optical test module remains tangential the horizontal arc as the optical test module moves in the horizontal arc.

The test module platform may be configured to support an optical test module including a single sub-module and a single optical window, wherein the sub-module is for both receiving at the optical window a light scan emitted by the Lidar sensor, and emitting from the optical window a simulated target reflection of the light scan to the Lidar sensor. Alternatively, or in addition, the test module platform may be configured to support an optical test module comprising separate first and second sub-modules and respective first and second optical windows, where the first sub-module is for receiving at the first optical window a light scan emitted by the Lidar sensor, and the second sub-module is for emitting from the second optical window a simulated target reflection of the light scan to the Lidar sensor.

According to another aspect of the inventive concepts, a method of testing a Lidar sensor is provided. The method includes mounting an optical test module on a test module platform such that an optical window of the optical test module faces a Lidar sensor to be tested, receiving at the optical window of the optical test module a light scan emitted by the Lidar sensor, and emitting from the optical window of the optical test module a simulated target reflection of the light scan to the Lidar sensor. The method further includes driving an actuator system of the test module platform such that the optical window of the optical test module automatically moves along a scanning path of the Lidar sensor while controlling a distance and orientation between the optical window of the optical test module and the Lidar sensor.

The distance between the optical window of the optical test module and the Lidar sensor may be controlled by moving the optical test module platform in a vertical arc centered on a focal point of the Lidar sensor. The optical test module platform may moved in the vertical arc by using a motor to rotate an arm that is pivotally mounted at one end and is fixed to the test module platform at another end, where a pivot point of the arm is aligned in a horizontal direction with a focal point of the Lidar sensor supported by the sensor platform. The distance may be further controlled by moving the test module platform in a horizontal arc centered on the focal point of the Lidar sensor. The test module platform may be moved in the horizontal arc by using a first motor to move the test module platform along a horizontal x-axis, and by using a second motor to move the test module platform along a horizontal y-axis perpendicular to the horizontal x-axis.

The orientation between the optical window of the optical test module and the Lidar sensor may be controlled by rotating the test module platform such that the optical window of the optical test module remains tangential the horizontal arc as the optical test module platform is moved in the horizontal arc.

The optical test module may be detachably mounted to the test module platform, and the test module platform may be configured for detachably mounting of any of plural different types of optical test modules. The plural different types of optical test modules may include a first type of optical test module including a single optical window and a single sub-module, and a second type of optical test module including two or more optical windows and two or more sub-modules.

According to still another aspect of the inventive concepts, an apparatus for testing a Lidar sensor is provided. The apparatus includes a test module platform, a Lidar sensor platform, and a base unit for controlling an optical test module mounted on the test module platform to receive a light scan emitted by a Lidar sensor mounted to the Lidar sensor platform, and to emit a simulated target reflection of the light scan to the Lidar sensor. The apparatus further includes an actuator system configured to automatically move the test module platform such that an optical window of the optical test module follows a scanning path of the Lidar sensor while controlling a distance and orientation between the optical window of the optical test module and the Lidar sensor.

The distance between the optical window of the optical test module and the Lidar sensor may be controlled by moving the test module platform in a vertical arc adjacent the Lidar sensor and by moving the test module platform in a horizontal arc adjacent the Lidar sensor, and the orientation between the optical window of the optical test module and the Lidar sensor may be controlled by rotating the test module platform such that the optical window of the optical test module remains tangential the horizontal arc as the test module platform is moved in the horizontal arc.

The test module platform may be configured for detachably mounting of any of plural different types of optical test modules. The plural different types of optical test modules may include a first type of optical test module including a single optical window and a single sub-module communicating with the base unit, and a second type of optical test module including two or more optical windows and two or more sub-modules communicating with the base unit.

The test module platform may be configured to support an optical test module including a single sub-module and a single optical window, where the sub-module is for both receiving at the optical window a light scan emitted by the Lidar sensor and transmitting a corresponding detection signal to the base unit, and emitting from the optical window a simulated target reflection of the light scan to the Lidar sensor based on a corresponding reflection signal received from the base unit. Alternatively, or in addition, the test module platform may be configured to support an optical test module including separate first and second sub-modules and respective first and second optical windows, where the first sub-module is for receiving at the first optical window a light scan emitted by the Lidar sensor and transmitting a corresponding detection signal to the base unit, and the second sub-module is for emitting from the second optical window a simulated target reflection of the light scan to the Lidar sensor based on a corresponding reflection signal received from the base unit . . .

BRIEF DESCRIPTION OF THE DRAWINGS

The above and other aspects and features of the inventive concepts will become readily apparent from the detailed description the follows, with reference to the accompanying drawings, in which.

DETAILED DESCRIPTION

Embodiments of the inventive concepts will now be described with reference to the accompanying drawings. It is emphasized that the various features illustrated in the drawings are not necessarily drawn to scale. In fact, the dimensions may be arbitrarily increased or decreased for clarity of discussion.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

Figure 1:
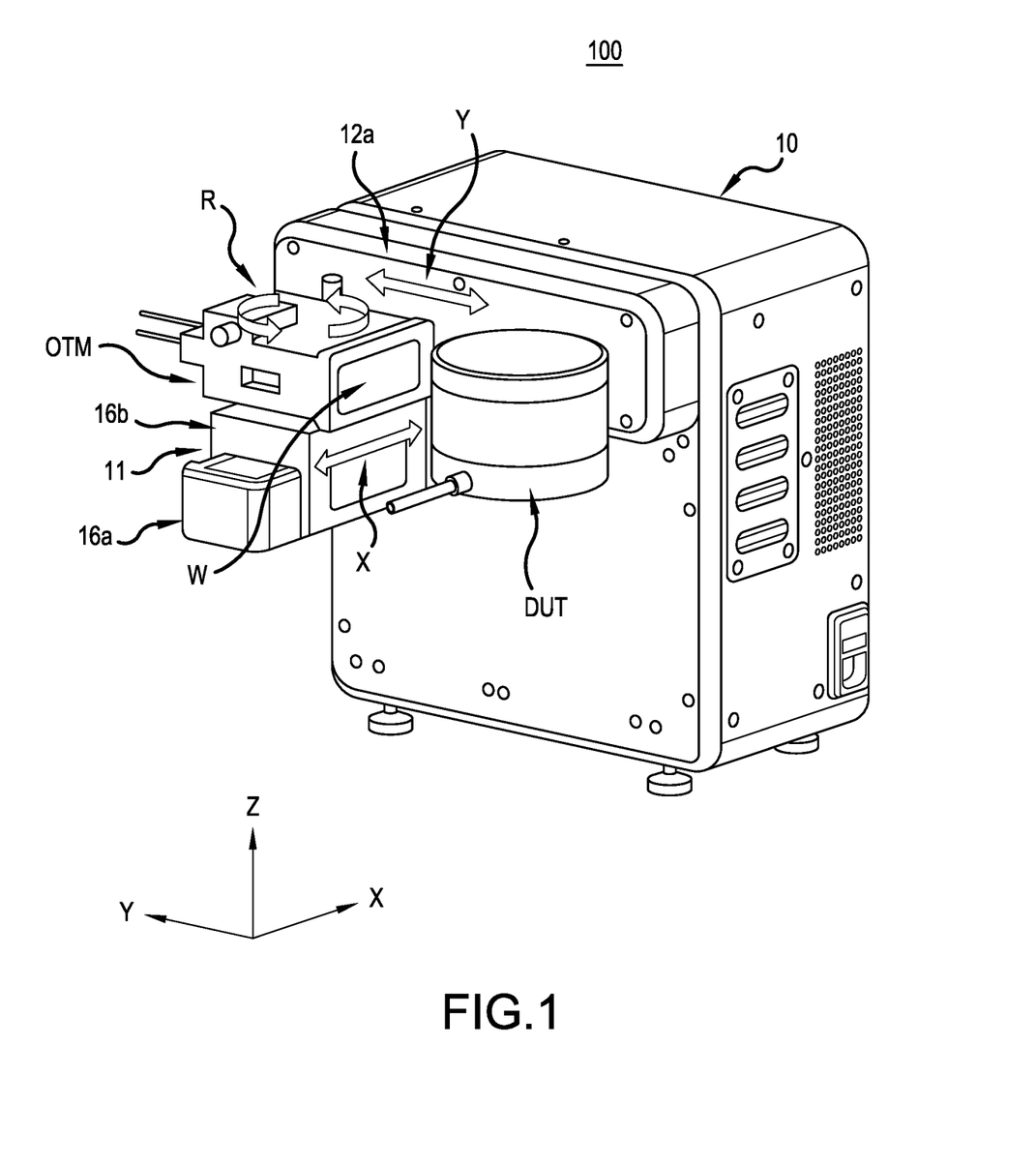
FIG. 1 is an external perspective view of an apparatus for automated positioning of an optical test module relative to a Lidar sensor during a target simulation test of the Lidar sensor according to an embodiment of the inventive concepts.
Figure 2:
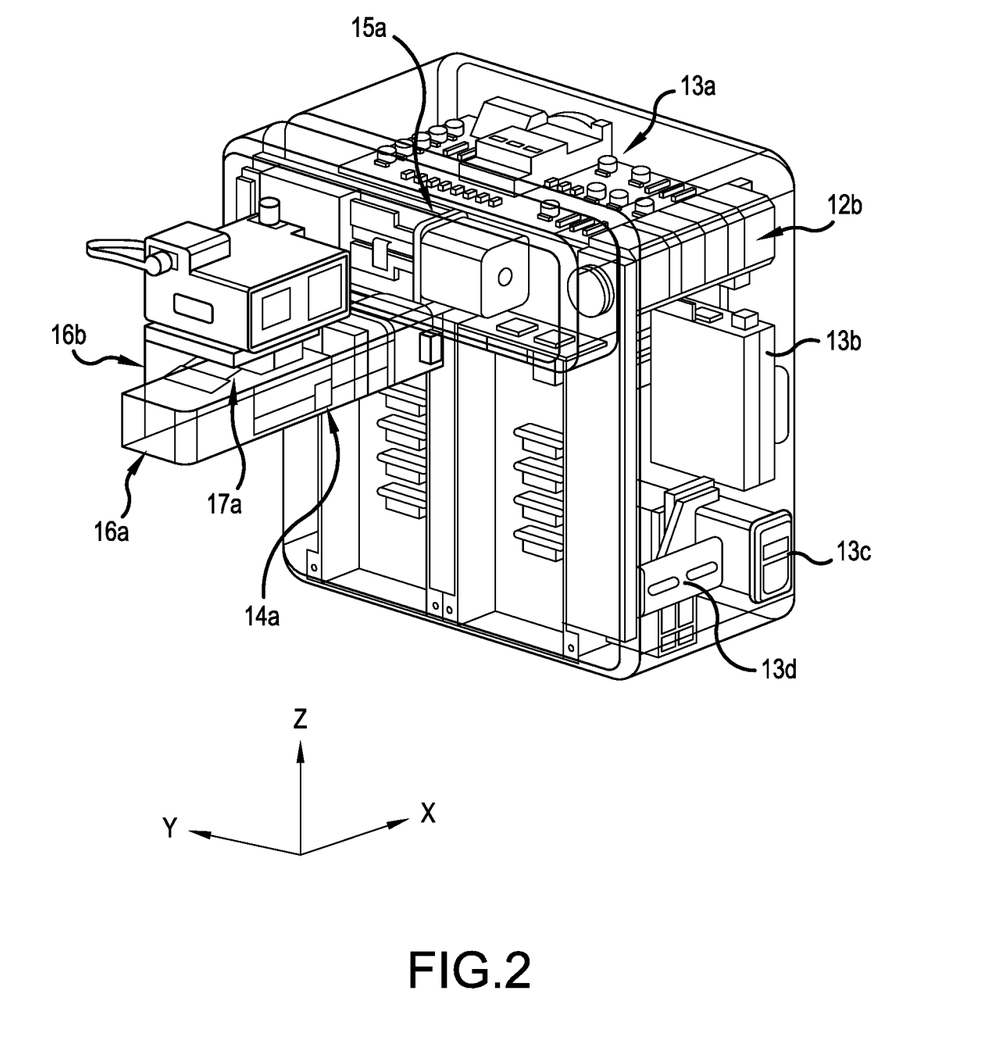
FIG. 2 is an internal perspective view of the apparatus of FIG. 1 according to an embodiment of the inventive concepts.

FIG. 1 is an external perspective an apparatus 100 for automated positioning of an optical test module relative to a Lidar sensor during a target simulation test of the Lidar sensor, and FIG. 2 is an internal perspective view of the same. For purposes of explanation and not limitation, the apparatus 100 may be referred to an automatic scanning system that forms part of a Lidar Target Simulator (LTS). Also for purposes of explanation and not limitation, directions parallel to an z-axis are referred to as vertical directions, directions parallel an x-axis are referred to as first horizontal directions, and directions parallel y-axis are referred to as second horizontal directions. The z-, x—and y-axes are all orthogonal to each other.

Referring to FIGS. 1 and 2, the apparatus 100 of the illustrated example includes a test module platform 11 configured to support an optical test module OTM. The optical test module OTM is supported by the test module platform 11 such that an optical window W of the optical test module OTM faces in a direction towards a Lidar sensor DUT. Although not shown in FIGS. 1 and 2, the Lidar sensor DUT may be supported by a sensor platform. The sensor platform may be separate and apart from the LTS 100, or may form an integral part of the LTS 100.

The test module platform 11 of this example includes a radial guide support 16a and an LTM stage 16b. The LTM stage 16b is slidably mounted in the first horizontal direction (x-axis direction) to the radial guide support 16a. As will be described below, an x-axis motor may be located within the radial guide support 16a to control movement of the LTM stage 16b along the first horizontal direction. In addition, as will also be described below, a rotational motor may be within the LTM stage 16b to rotate the optical test module OTM located thereon.

The LTS 100 further includes vertical, horizontal and rotational actuators, examples of which are described below. Each actuator may include one or more motors such as linear and/or rotational motors. Further, each actuator may include gears, shafts, guide mechanisms, arms, and the like. The vertical and horizontal actuators are configured to convey the optical test module OTM in vertical and horizontal directions, respectively, and the rotational actuator is configured to rotate the optical test module about a vertical axis of the test module platform.

In the example of the present embodiment, the vertical actuator includes a pivotally mounted arm 12a and a first rotational motor 12b that are configured to convey the test module platform 11 relative to the Lidar sensor DUT such that the optical test module OTM moves up-and-down in an arc generally along the vertical direction (i.e., an arc along the z-axis direction) while the optical window W of the optical test module OTM faces the Lidar sensor.

Still referring to FIGS. 1 and 2, the pivotally mounted arm 12a of the vertical actuator has one end pivotally mounted to the housing 10 and a distal end that directly or indirectly supports the test module platform 11. In the example of the present embodiment, the previously described radial guide support 16a is fixed to the distal end of the pivotally mounted arm 12a. The first rotational motor 12b of the vertical actuator rotates the pivotally mounted arm 12a about a pivot point of the pivotally mounted arm 12a. For example, the first rotational motor 12b may include rotatable shaft extending from within the module housing 10 to engage the pivotally mounted arm 12a at the pivot point. As will be discussed later, the pivot point of the pivotally mounted arm 12a may be aligned in the first horizontal direction (i.e., the x-axis direction) with a focal point of the Lidar sensor DUT. Rotation of the motor shaft by the first rotational motor 12b causes the pivotally mounted arm 12a to rotate about the pivot point, which in turn conveys the test module platform 11 (and the optical test module OTM) along a vertical arc.

In the meantime, the afore-mentioned horizontal actuator of the example of the present embodiment includes an x-axis linear motor 14a and a y-axis linear motor 15a. These x-axis and y-axis motors 14a and 15a are configured to jointly convey the test module platform 11 relative to the Lidar sensor DUT such that the optical test module OTM moves back-and-forth in an arc generally extending along the first horizontal direction (i.e., curved along the x-axis direction) while the optical window W of the optical test module OTM faces the Lidar sensor.

The x-axis linear motor 14a may be located at least partially within a radial guide support 16a. As previously mentioned, the LTM stage 16b is slidably mounted in the first horizontal direction (x-axis direction) to the radial guide support 16a. The x-axis linear motor 14a is configured to control movement of the LTM stage 16b along the first horizontal direction of the radial guide support 16a.

The y-axis linear motor 15a may be located within the pivotally mounted arm 12a, and include a linear drive mechanism fixed to the radial guide support 16a through an opening in a wall of the pivotally mounted arm 12a. The y-axis linear motor 15a is operative to convey the radial guide support 16a along a length of the pivotally mounted arm 12a in the second horizontal direction (i.e., the y-axis direction).

The afore-mentioned rotational (R) actuator may be implemented by a second rotational motor 17a located, for example, in the LTM stage 16b and figured for rotational attachment to the optical test module OTM. The second rotational motor 17a is operated to rotate the optical test module OTM about the vertical axis (i.e., the z-axis) of the LTM stage 16b. It is noted that a portion of the LTM stage 16b directly supporting the optical test module OTM may rotate together with the optical test module OTM. In an alternative embodiment, the optical test module OTM may include a rotational motor to achieve the desired rotation.

The LTS 100 of the illustrated example further includes a module housing 10 for supporting one or more of the previously described motors, as well as the pivotally mounted arm 12/radial guide support 16/LTM stage 16b assembly. In addition, the module housing 10 may include various circuits and electronic components for controlling an operation of the x-axis linear motor 14a, the y-axis linear motor 15a, the first rotational motor 12b, and the second rotational motor 17a to follow an optical scanning of the Lidar sensor DUT. Examples of such components are generally represented by reference numbers 13a, 13b, 13c and 13d in FIG. 2. The circuits/components may include a motherboard 13a having components such as a processor, RAM and ROM memories, bus systems, input/output (I/O) ports and the like. The circuits/components may further include a hard drive 13b and an AC power inlet 13c. The circuits/components may still further include external connectors 13d, such as serial and/or parallel data ports for communicating with an external device such as a base unit.

Figure 3:
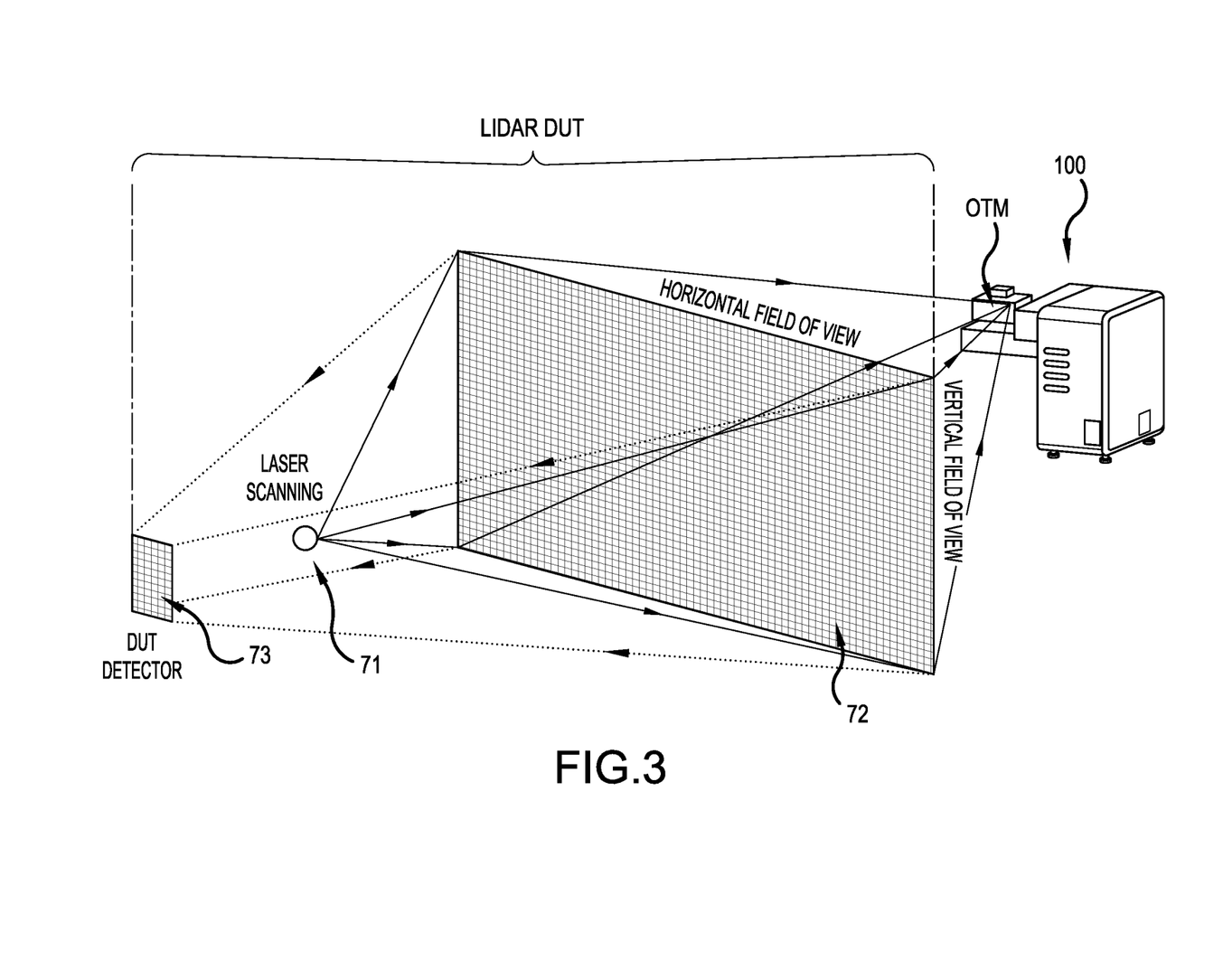
FIG. 3 is a schematic diagram of a Lidar sensor and the apparatus of FIG. 1 according to an embodiment of the inventive concepts.

Reference is now made to the schematic view of FIG. 3 for describing the principal components of the Lidar DUT. As shown, while there are many types of Lidar sensors, they typically include a laser 71 emitting light beams throughout a given coverage area 72 defined by horizontal and vertical fields of view. For example, the emitted light beam may scan vertically and swept horizontally within the coverage area. The emitted beam is incident on the optical window W of the optical test module OTM mounted on the apparatus 100 as represented in the FIG. 3. The optical test module OTM is operative under control of a base unit (described later) to emit a simulated (delayed) reflection light of a target that is received by a DUT detector 73 of the Lidar DUT. As explained below. the actuator systems of the apparatus 100 are operative such that the optical window W of the optical test module OTM automatically moves along a scanning path of the Lidar sensor while controlling a distance and orientation between the optical window W of the optical test module OTM and the Lidar sensor DUT.

Figure 4:
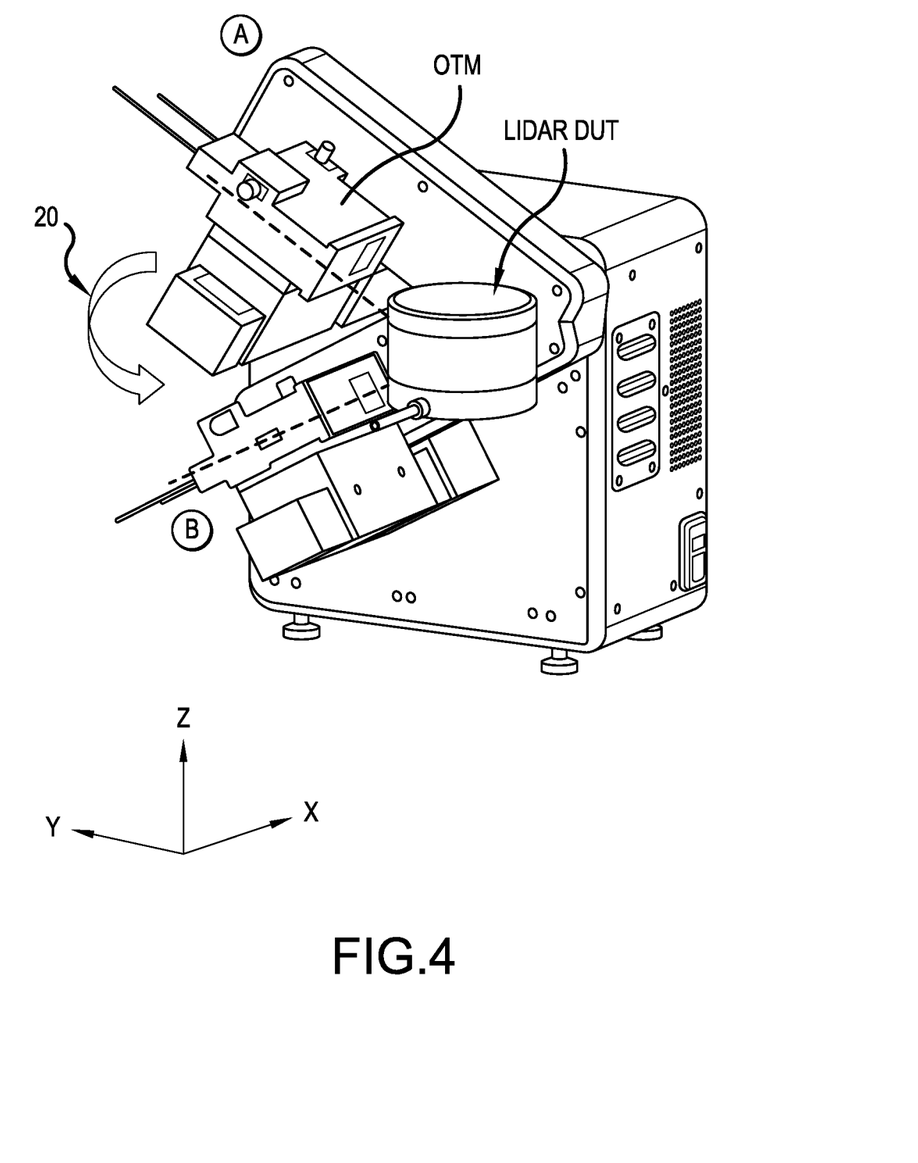
FIGS. 4 and 5 are perspective views for reference in explaining vertical scanning of an optical test module of the apparatus of FIG. 1 according to an embodiment of the inventive concept.
Figure 5:
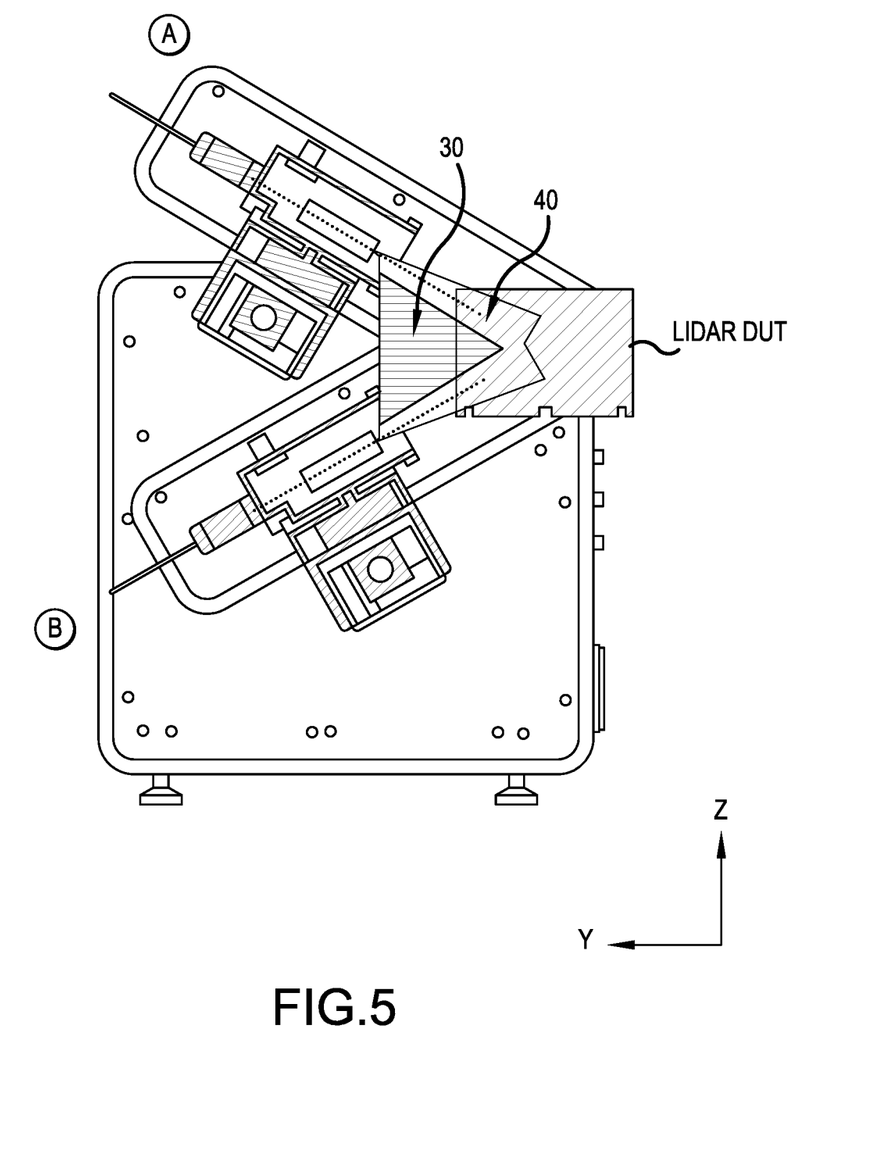

FIGS. 4 and 5 are perspective views for reference in explaining vertical scanning of an optical test module OTM of the apparatus of FIG. 1 according to an embodiment of the inventive concept.

FIGS. 4 and 5 show the pivotally mounted arm 12 of apparatus 100 at an upper scanning position A and a lower scanning position B. As the pivotally mounted arm 12 is scanned between A and B, it will be apparent that the optical test module OTM travels in a vertical arc. Reference number 30 of FIG. 5 represents the vertical field of view coverage angle of the Lidar DUT, which is much greater than the area of the optical test module OTM capture angle 40. By moving the optical test module OTM vertically, the coverage of the light beam acceptance angle can be increased (e.g., to 60 degrees) to fully encompass the coverage angle of the Lidar DUT. Further, since the vertical movement is arced, the distance between the optical window W of the optical test module OTM and the focal point of the Lidar DUT is substantially controlled to be constant, thus improving performance. In an example embodiment, the pivot point of the pivotally mounted arm 12 is aligned in a horizontal direction with a focal point of the Lidar sensor DUT. Alternatively, or in addition, a center point defined by the vertical arc may correspond to the focal point of the Lidar sensor.

Figure 6:
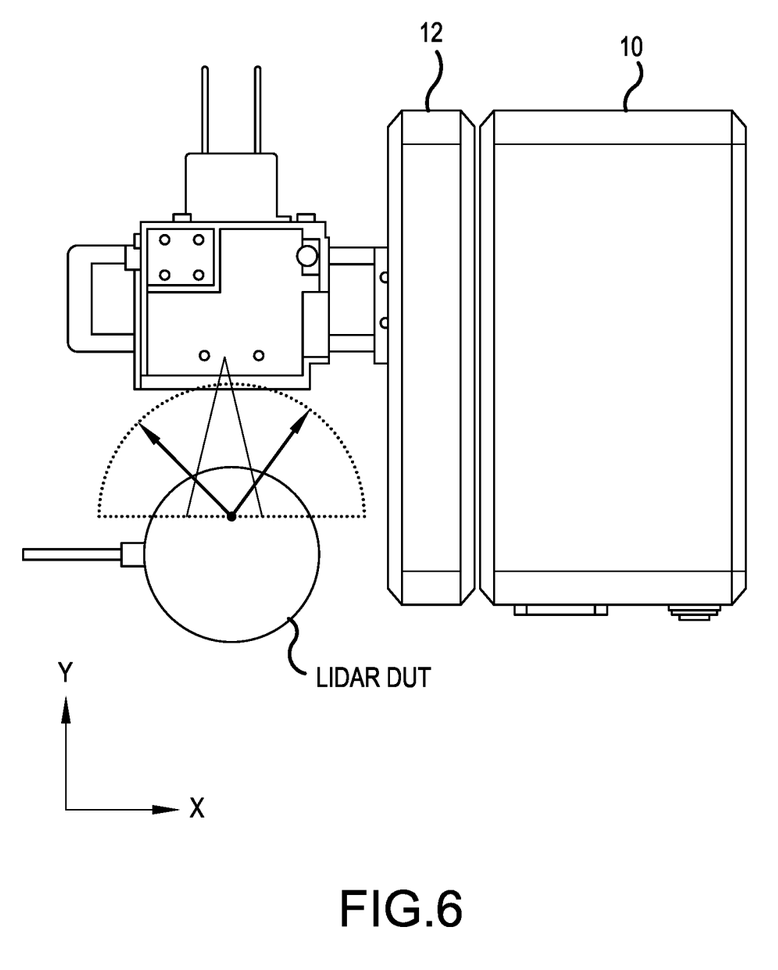
FIGS. 6 and 7 are perspective views for reference in explaining horizontal scanning of an optical test module of the apparatus of FIG. 1 according to an embodiment of the inventive concepts.
Figure 7:
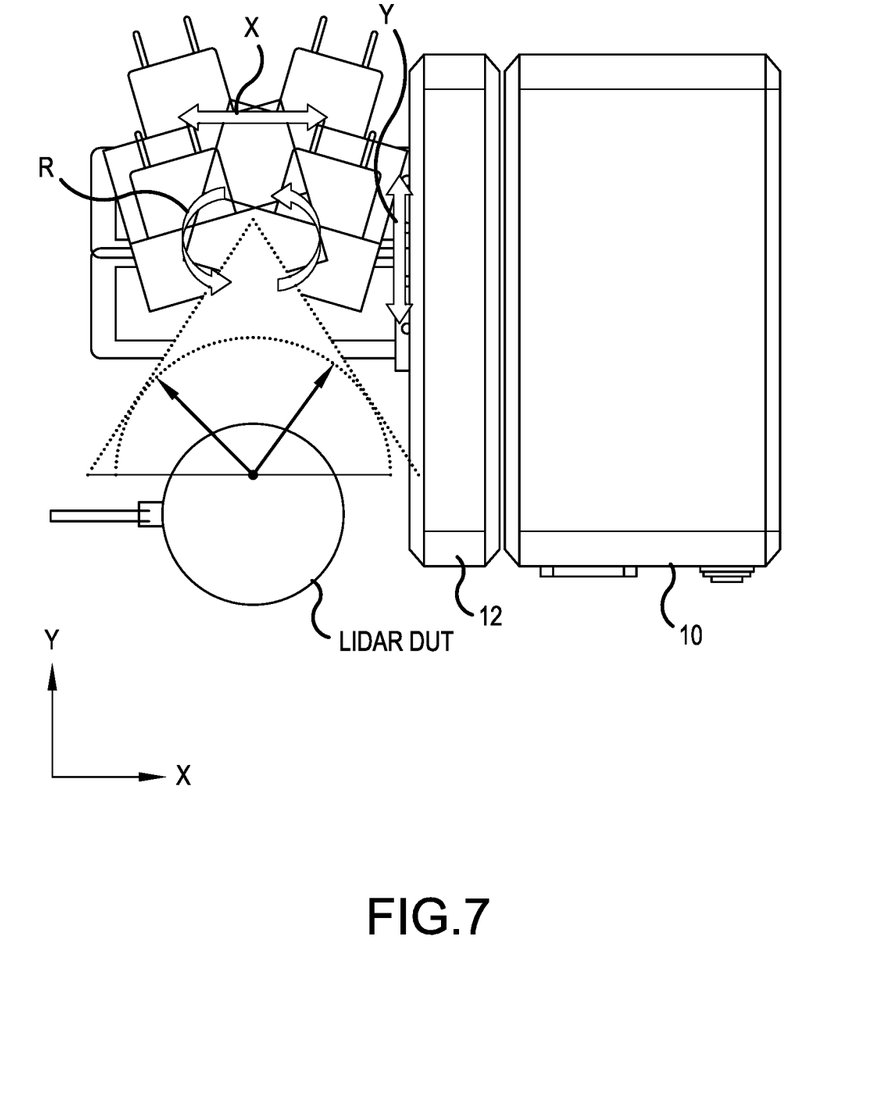

FIGS. 6 and 7 are perspective views for reference in explaining horizontal scanning of an optical test module OTM of the apparatus of FIG. 1 according to an embodiment of the inventive concept.

Referring to FIGS. 6 and 7, the afore-described x-axis and y-axis motors are driven to convey the optical test module OTM in a horizontal arc 55. By moving the optical test module OTM horizontally in this manner, the coverage of the optical test module OTM capture angle 40 can be increased (e.g., to 60 degrees) to fully encompass the coverage angle of the Lidar sensor DUT (as is represented by reference number 55 in FIG. 7). Further, by rotating (R) the optical test module OTM about the vertical axis, the optical window W can be made to face the Lidar sensor DUT as the optical test module OTM travels along the horizontal arc 55. In other words, the optical window W may be oriented tangentially the horizontal arc 55 as the optical test module OTM moves in the horizontal arc 55. In an embodiment, a center point C of the horizontal arc 55 corresponds to a focal point of the Lidar sensor DUT.

The apparatus 100 described above provides a mechanism for the optical test module OTM to automatically move along four (4) axes in order to effectively increase a capture angle of the optical test module OTM, and in order to maintain a distance and orientation between the optical test module OTM and Lidar sensor DUT. The control system may store each coordinate of the 4-axis system relative to each scanning coordinate of the Lidar sensor DUT. In the manner, the optical test module OTM may capture any scanning beam of the Lidar sensor DUT at that same scanning distance and orientation.

Figure 8:
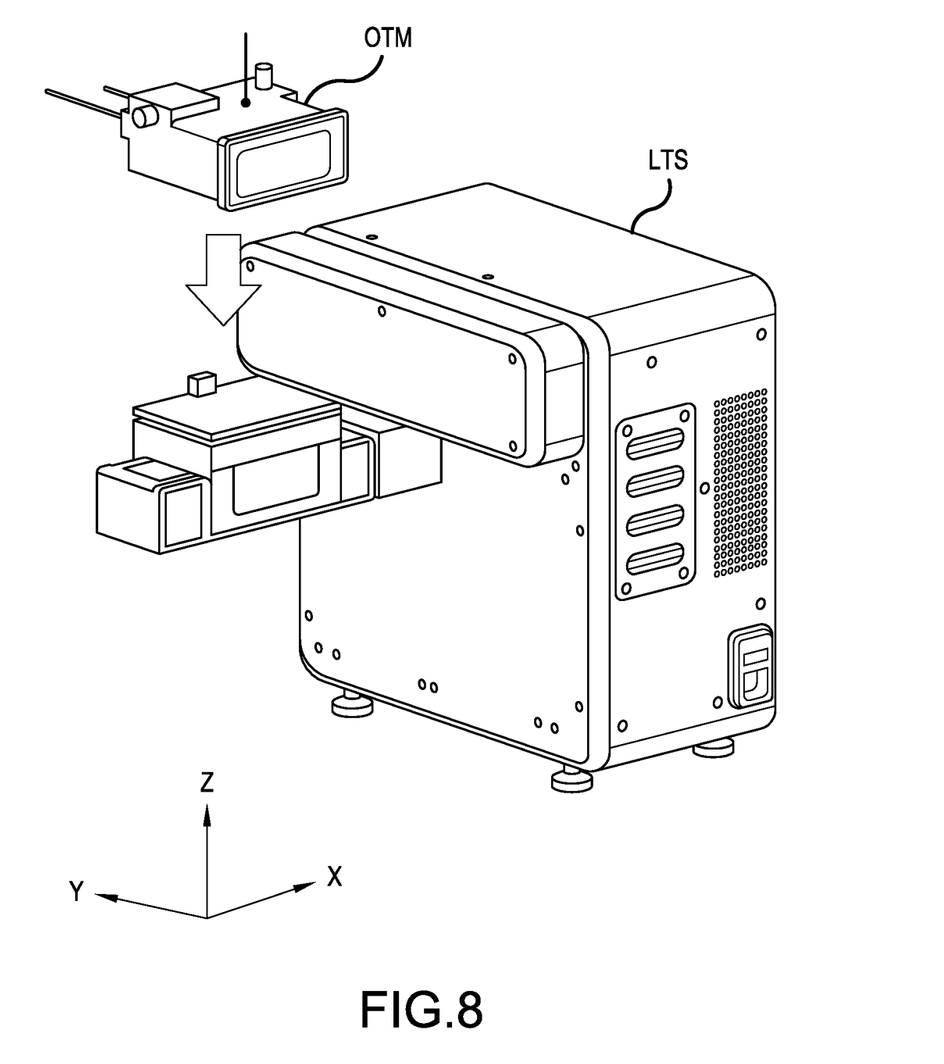
FIG. 8 is a perspective view for reference in explaining detachable mounting of an optical test module in the apparatus of FIG. 1 according to an embodiment of the inventive concepts.

FIG. 8 is a perspective view for reference in describing the detachability of the optical test module OTM to the LTS 100 according to an embodiment of the inventive concepts.

Figure 9:
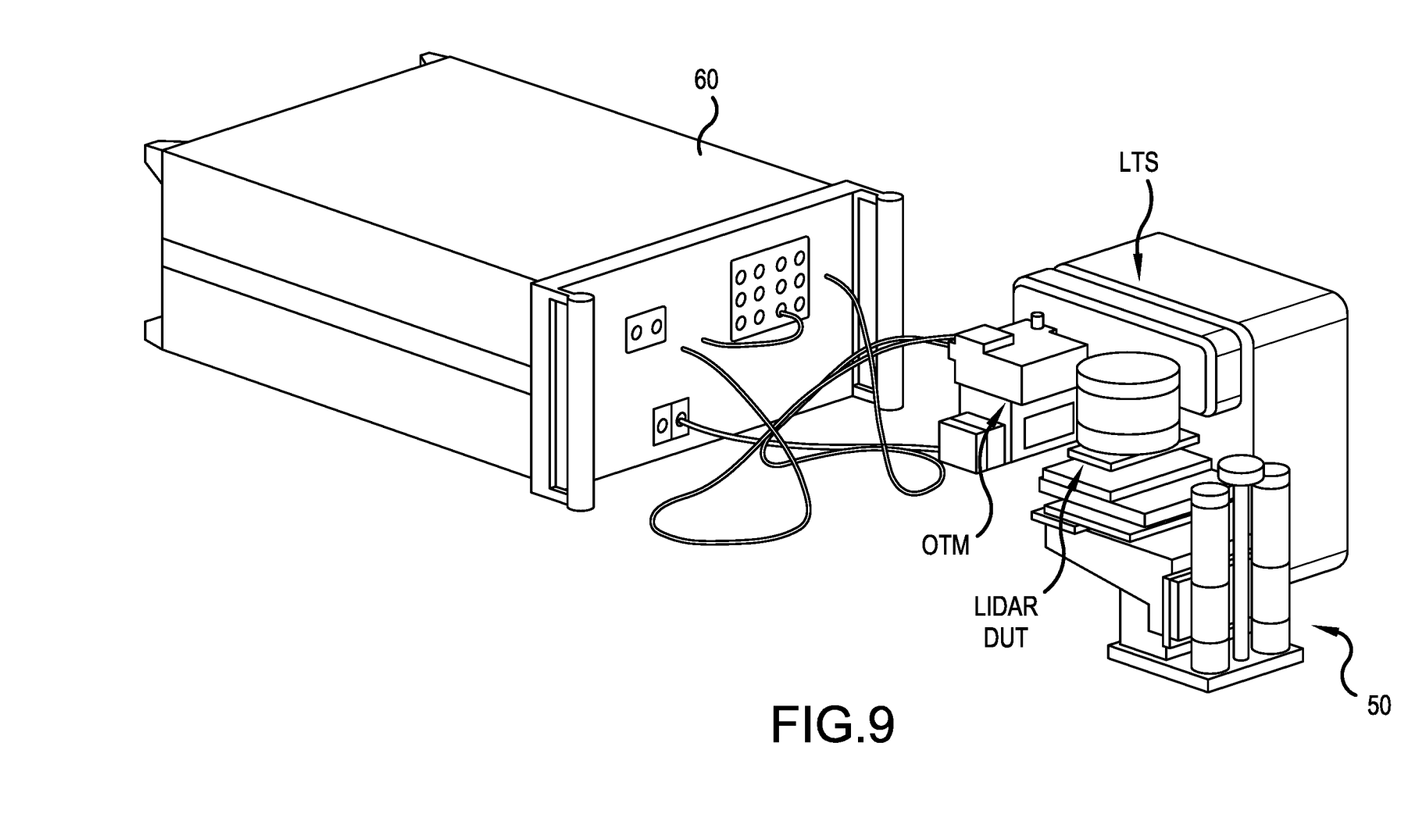
FIG. 9 is a perspective view of a test set-up including the apparatus of FIG. 1, a base unit and rotatable Lidar platform according to an embodiment of the inventive concepts.

Referring to FIG. 9, in an embodiment of the inventive concepts, the test module platform 11 (or the LTM stage 16b) may be configured for detachably mounting of any of plural different types of optical test modules OTMs. This may be useful in readily adapting the apparatus 100 to different types of the Lidar sensors. The different types of optical test modules OTMs may include those including a single optical window and a single sub-module communicating with a base unit, and/or those including two or more optical windows and two or more sub-modules communicating with the base unit. That is, the test module platform 11 (or the LTM stage 16b) may be configured to support an optical test module OTM having a single sub-module and a single optical window, where the sub-module is for both receiving at the optical window a light scan emitted by the Lidar sensor and transmitting a corresponding detection signal to a base unit, and emitting from the optical window a simulated target reflection of the light scan to the Lidar sensor based on a corresponding reflection signal received from the base unit. Alternative, or in addition, the test module platform 11 (or the LTM stage 16b) may be configured to support an optical test module OTM comprising separate first and second sub-modules and respective first and second optical windows, where the first sub-module is for receiving at the first optical window a light scan emitted by the Lidar sensor and transmitting a corresponding detection signal to the base unit, and the second sub-module is for emitting from the second optical window a simulated target reflection of the light scan to the Lidar sensor based on a corresponding reflection signal received from the base unit.

FIG. 9 is a perspective view of a test set-up including the apparatus 100 of FIG. 1, together with a base unit and rotatable Lidar platform according to an embodiment of the inventive concepts.

The base unit 60 is configured to control an operation of the optical test module OTM mounted on the test module platform of the apparatus 100 according to a target simulation program executed for testing the Lidar sensor. Briefly, the base unit 60 controls the optical test module OTM to receive a light scan emitted by the Lidar sensor DUT, to delay the light according to characteristics of a simulated target, and to emit a simulated target reflection of the light scan to the Lidar sensor. An example of the base unit 60 is described in commonly assigned U.S. patent application Ser. No. 17/126,085, filed Dec. 18, 2020, the disclosure of which is incorporated herein in its entirety by reference.

During the target simulation carried out by the base unit 60 and optical test module OTM, the actuator system of the apparatus 100 is driven such that the optical window W of the optical test module OTM automatically moves along a scanning path of the Lidar sensor DUT while controlling a distance and orientation between the optical window W of the optical test module OTM and the Lidar sensor DUT. As mentioned previously, this can be achieved by storing in advance each coordinate of the 4-axis system of the optical test module OTM relative to each scanning coordinate of the Lidar sensor DUT.

FIG. 9 also shows a Lidar sensor platform for supporting the Lidar sensor DUT during testing, as well as a rotational mechanism including a motor for rotating the Lidar sensor DUT. In an embodiment of the inventive concepts, the horizontal and vertical position of the Lidar sensor DUT are fixed, but the Lidar sensor DUT can be automatically rotated if desired. In addition, in an embodiment of the inventive concepts, the Lidar sensor platform can be configured for mounting of any of plural different types of Lidar sensors. This allows for the sharing of the same scanning automation platform for different types of Lidar sensors.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

What is claimed is:

1. An apparatus for automated positioning of an optical test module relative to a Lidar sensor during a target simulation test of the Lidar sensor, the apparatus comprising:
    a test module platform configured to support an optical test module such that an optical window of the optical test module faces in a direction towards a Lidar sensor under test;
    a vertical actuator configured to convey the test module platform relative to a sensor platform such that the optical test module moves in a vertical arc while the optical window of the optical test module faces the Lidar sensor;
    a horizontal actuator configured to convey the test module platform relative to the Lidar sensor such that the optical test module moves in a horizontal arc while the optical window of the optical test module faces the Lidar sensor; and
    a rotational actuator configured to rotate the optical test module about a vertical axis of the test module platform.

2. The apparatus of claim 1, wherein the vertical actuator comprises:
    a pivotally mounted arm having a distal end fixed to the test module platform; and
    a motor for rotating the pivotally mounted arm about a pivot point of the pivotally mounted arm.

3. The apparatus of claim 2, wherein the pivot point of the pivotally mounted arm is aligned in a horizontal direction with a focal point of the Lidar sensor.

4. The apparatus of claim 2, wherein the horizontal actuator comprises:
    an x-axis motor configured to move the test module platform such that the optical test module moves along a horizontal x-axis; and
    a y-axis motor configured to move the test module platform such that the optical test module moves along a horizontal y-axis perpendicular to the x-axis.

5. The apparatus of claim 1, wherein the test module platform is configured to detachably support any of plural different types of optical test modules.

6. The apparatus of claim 5, wherein the plural different types of optical test modules include a first type of optical test module including a single optical window and a single sub-module, and a second type of optical test module including two or more optical windows and two or more sub-modules.

7. The apparatus of claim 1, further comprising a sensor platform for supporting the Lidar sensor, wherein a horizontal and a vertical position of the sensor platform is fixed.

8. The apparatus of claim 7, further comprising a second rotational actuator configured to rotate the Lidar sensor about a vertical axis of the sensor platform.

9. The apparatus of claim 7, wherein a center point defined by the vertical arc corresponds to a focal point of the Lidar sensor supported by the sensor platform.

10. The apparatus of claim 9, wherein a center point defined by the horizontal arc corresponds to the focal point of the Lidar sensor supported by the sensor platform.

11. The apparatus of claim 1, wherein the rotational actuator is configured to rotate the optical test module such that the optical window of the optical test module remains tangential the horizontal arc as the optical test module moves in the horizontal arc.

12. The apparatus of claim 1, wherein the test module platform is configured to support an optical test module comprising a single sub-module and a single optical window, wherein the sub-module is for both receiving at the optical window a light scan emitted by the Lidar sensor, and emitting from the optical window a simulated target reflection of the light scan to the Lidar sensor.

13. The apparatus of claim 1, wherein the test module platform is configured to support an optical test module comprising separate first and second sub-modules and respective first and second optical windows,
   wherein the first sub-module is for receiving at the first optical window a light scan emitted by the Lidar sensor, and the second sub-module is for emitting from the second optical window a simulated target reflection of the light scan to the Lidar sensor.

14. A method of testing a Lidar sensor, comprising:
   mounting an optical test module on a test module platform such that an optical window of the optical test module faces a Lidar sensor to be tested;
   receiving at the optical window of the optical test module a light scan emitted by the Lidar sensor, and emitting from the optical window of the optical test module a simulated target reflection of the light scan to the Lidar sensor; and
   driving an actuator system of the test module platform such that the optical window of the optical test module automatically moves along a scanning path of the Lidar sensor while controlling a distance and orientation between the optical window of the optical test module and the Lidar sensor, wherein the distance between the optical window of the optical test module and the Lidar sensor is controlled by moving the optical test module platform in a vertical arc centered on a focal point of the Lidar sensor.

15. An apparatus for testing a Lidar sensor, comprising:
   a test module platform;
   a Lidar sensor platform;
   a base unit for controlling an optical test module mounted on the test module platform to receive a light scan emitted by a Lidar sensor mounted to the Lidar sensor platform, and to emit a simulated target reflection of the light scan to the Lidar sensor; and
   an actuator system configured to automatically move the test module platform such that an optical window of the optical test module follows a scanning path of the Lidar sensor while controlling a distance and orientation between the optical window of the optical test module and the Lidar sensor.

16. The apparatus of claim 15, wherein the distance between the optical window of the optical test module and the Lidar sensor is controlled by moving the test module platform in a vertical arc adjacent the Lidar sensor and by moving the test module platform in a horizontal arc adjacent the Lidar sensor, and
   wherein the orientation between the optical window of the optical test module and the Lidar sensor is controlled by rotating the test module platform such that the optical window of the optical test module remains tangential the horizontal arc as the test module platform is moved in the horizontal arc.

17. The apparatus of claim 15, wherein the test module platform is configured for detachably mounting of any of plural different types of optical test modules.

18. The apparatus of claim 17, wherein the plural different types of optical test modules include a first type of optical test module including a single optical window and a single sub-module communicating with the base unit, and a second type of optical test module including two or more optical windows and two or more sub-modules communicating with the base unit.

19. The apparatus of claim 15, wherein the test module platform is configured to support an optical test module comprising a single sub-module and a single optical window, wherein the sub-module is for both receiving at the optical window a light scan emitted by the Lidar sensor and transmitting a corresponding detection signal to the base unit, and emitting from the optical window a simulated target reflection of the light scan to the Lidar sensor based on a corresponding reflection signal received from the base unit.

20. The apparatus of claim 15, wherein the test module platform is configured to support an optical test module comprising separate first and second sub-modules and respective first and second optical windows,
   wherein the first sub-module is for receiving at the first optical window a light scan emitted by the Lidar sensor and transmitting a corresponding detection signal to the base unit, and the second sub-module is for emitting from the second optical window a simulated target reflection of the light scan to the Lidar sensor based on a corresponding reflection signal received from the base unit.

* * * * *